US012705377B2

(12) United States Patent
Shanawaz et al.

(10) Patent No.: US 12,705,377 B2
(45) Date of Patent: Aug. 11, 2026

(54) GRAPH-BASED ENTITLEMENT ENFORCEMENT

(71) Applicant: Capital One Services, LLC, McLean, VA (US)

(72) Inventors: Sulbigar Shanawaz, Herndon, VA (US); Gabriel Marwell, Alexandria, VA (US); Madhuri Margam, Brambleton, VA (US); Vineet Kalpathi, Ashburn, VA (US); Suresh Busayavalasa, South Riding, VA (US); Abhay Singh, Columbia, MD (US); Daniel Feuerstein, Potomac, MD (US); Prabu Balasubramanian, Vienna, VA (US); Prem Anil Kumar Manikonda, McLean, VA (US); Anil Kavalipurapu, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 81 days.

(21) Appl. No.: 18/957,602

(22) Filed: Nov. 22, 2024

(65) Prior Publication Data

US 2026/0147905 A1 May 28, 2026

(51) Int. Cl.

*H04L 29/06* (2006.01)
*G06F 21/60* (2013.01)
*G06F 21/62* (2013.01)

(52) U.S. Cl.

CPC ........ *G06F 21/604* (2013.01); *G06F 21/6227* (2013.01)

(58) Field of Classification Search

CPC ........................... G06F 21/604; G06F 21/6227
See application file for complete search history.

(56) References Cited

U.S. PATENT DOCUMENTS

2016/0254911 A1* 9/2016 Manchepalli ............. H04L 9/14 713/193
2019/0124104 A1* 4/2019 Apostolopoulos .......................... G06F 16/9024
2020/0357507 A1* 11/2020 Blalock .................. G16H 10/60

* cited by examiner

*Primary Examiner* — Evans Desrosiers
(74) *Attorney, Agent, or Firm* — Foley & Lardner LLP

(57) ABSTRACT

Described herein are systems, methods, and programming for enforcing attribute-level entitlements within a super-graph. Entitlements can be enforced prior to a graph API routing a request to a sub-graph, corresponding to pre-enforcement entitlement policies. Post-enforcement entitlements can also be applied to a response payload from the sub-graph prior to a response being provided to a requesting device. The entitlements can prevent certain data from being accessed. The entitlements can protect data down to the attribute-level (e.g., a graph endpoint). Furthermore, the entitlements can redact or otherwise obfuscate certain data.

20 Claims, 10 Drawing Sheets

Data Product 320

Data Product : Deposit Account
Key : Account Reference ID
Entity : Deposit Account Servicing Information
Attr : Account Purpose
Attr : Account Nickname
Entity : Deposit Account Balance
Attr : Available Balance
Attr : Collected Balance
Attr : Ledger Balance

GRAPH-BASED ENTITLEMENT ENFORCEMENT

BACKGROUND

GraphQL and REST are two separate application programming interface (API) architectures that facilitate data exchanges between servers and clients. Both GraphQL and REST are HTTP-based. GraphQL utilizes a single endpoint for data access, whereas REST has multiple endpoints.

SUMMARY

Methods and systems are described herein for novel uses and/or improvements to entitling graph APIs. As one example, methods and systems are described herein for enforcing attribute-level entitlements within a super-graph.

As graph technologies are being used more readily to serve data as opposed to conventional REST technologies, there are limited options available for enforcing entitlements. For example, because graphs enable specific data to be accessed without fears of over-fetching (or under-fetching), technical problems exist in providing fine-grained access control, down to the lowest unit of data (e.g., an attribute). Existing technologies, including those associated with REST APIs, offer broad-stroke authorizations to be applied, which are limited and often are pre-loaded. At runtime, a request can be compared to the pre-loaded rules to determine how the request is to be processed. There are no existing solutions for providing authorization at any level of the graph schema, such as at the entity level or the attribute level, as well as concurrently performing complex data fetching operations. Furthermore, there are no existing solutions for applying such authorization rules in real time. Still further, there are no existing solutions for applying pre-enforcement entitlements and/or post-enforcement entitlements before serving data via a federated router.

To solve some or all of the above-described technical problems, a system for enforcing attribute level entitlements within a super-graph is described. The system can deploy an entitlement policy plugin. For example, technical solutions are described for deploying an entitlement policy plugin for a router, such as the Apollo router. In some embodiments, the entitlements policy plugin may apply the various entitlement policies at runtime to incoming requests from a client. These requests can be directed to one or more sub-graphs, which may be managed by one or more data providers. This technical solution has numerous technical advantages. For instance, the entitlement policy plugin can service capabilities of different sub-graph data providers, who may each apply different entitlement policies at varying levels of granularity. Additionally, the entitlement policy plugin reduces latency in applying the entitlement policies at run time, is able to manage high TPS rates, and is readily available.

Another technical solution includes implementing the entitlement policies using custom directives available via the GraphQL query language. In some embodiments, a new custom directive (e.g., "@enterprise_entitle") may be used by the entitlement policy plugin to apply entitlements at the federation router. The directive can be defined during authoring of schema during a subgraph's registration process during data exchange. The directive can define an argument to define additional metadata for application of one or more entitlement policies. The directive can also enable a data provider, managing a given sub-graph, to define any pre-enforcement entitlement policies and/or post-enforcement entitlement policies to be applied. Furthermore, argument names from query operations, along with response field names for query operation responses, can be specified for application of certain pre-enforcement and/or post-enforcement entitlement policies.

As an example, pre-enforcement entitlement policies correspond to rules that can reject certain API calls prior to those API calls being forwarded to a sub-graph. For example, based on the schema and/or the requesting client device, a pre-enforcement entitlement policy may be applied to a received graph query API call that allows a first sub-graph associated with a first entity, managed by a first data provider, to be accessed while preventing a second sub-graph associated with a second entity, managed by a second data provider, from being accessed. Post-enforcement entitlement policies correspond to rules that perform rejections/redactions of data after receiving the response payload from the sub-graph responding to the graph query API call. For example, based on the schema and/or the requesting client device, a post-enforcement entitlement policy may be applied to a response payload from a sub-graph that allows data associated with a first attribute of the first entity to be included in a response to the graph query API call and prevents data associated with a second attribute of the first entity from being included in the response. In some examples, preventing the data associated with the second attribute from being provided to a client device may include removing it from the response payload or redacting (i.e., obfuscating) that data. In some embodiments, pre-enforcement and post-enforcement entitlement policies may be applied for a given request.

Still further, technical solutions are described for mapping entitlement policies and/or rules specified by the entitlement policies to entitlement keywords for applying the entitlement policies at runtime. The rule mapping enables a schema to be parsed to identify schema keywords. The schema keywords can be compared to a pre-defined list of entitlement keywords. Each entitlement keyword may be associated with one or more entitlement policies (pre-enforcement/post-enforcement entitlement policies). Therefore, by identifying one or more entitlement keywords within a schema can enable the appropriate entitlement policies to be retrieved and applied.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
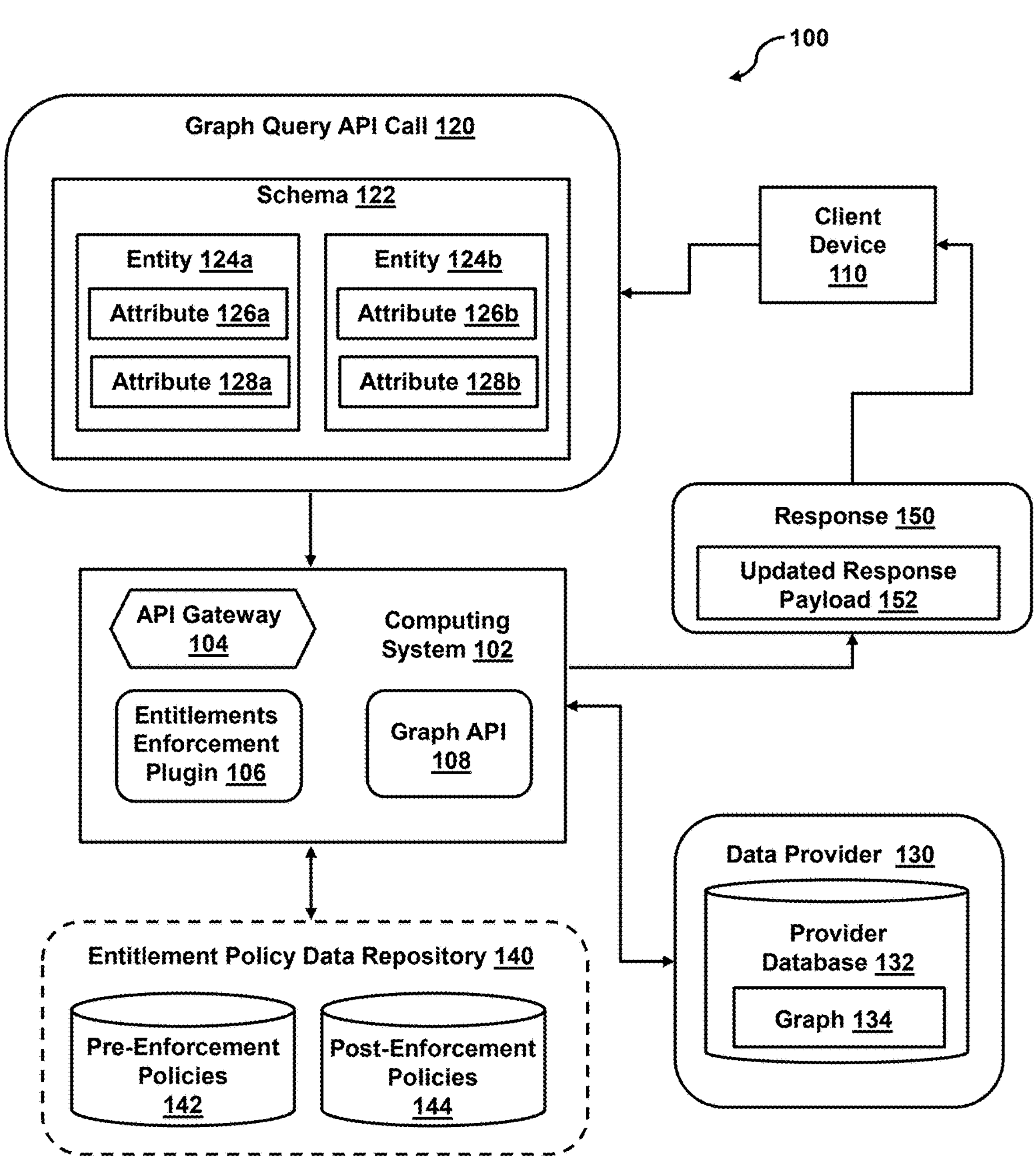
FIG. 1 shows an illustrative system for enforcing data-attribute level entitlements within a graph, in accordance with one or more embodiments.

FIG. 1 shows an illustrative system 100 for enforcing data-attribute level entitlements within a graph, in accordance with one or more embodiments. For example, FIG. 1 illustrates a computing system 102 configured to execute computer code to deploy an application programing interface (API) gateway 104, an entitlements enforcement plugin 106, a graph API 108, or other functionalities. API gateway 104 may facilitate communications between client devices, such as client device 110, and graph API 108. Graph API 108 may serve as a singular endpoint for data exchanges with a data provider 130. Data provider 130 may include a provider database 132 storing data using a graph 134. Graph 134 can also be referred to as a "sub-graph."

As mentioned above, system 100 may include computing system 102, which may communicate with client device 110, data provider 130, entitlement policy data repository 140, or other devices, systems, servers, or combinations thereof. Furthermore, while a single instance of certain components is depicted in FIG. 1 (e.g., computing system 102, client device 110, data provider 130), persons of ordinary skill in the art will recognize that this is merely illustrative, and additional computing systems, client devices, databases, or other components, may be included in system 100. Furthermore, provider database 132 can store additional graphs and/or data. For example, provider database 132 may store a first graph corresponding to a first entity and a second graph corresponding to a second entity. The data stored in the first and second graphs may be controlled by data provider 130. For example, data provider 130 may store a graph of authorized accounts and a graph of available functions, each of which may be queried.

In some embodiments, computing system 102 may be configured to receive a request from client device 110. For example, the request may be a graph query API call 120 including a schema 122. Schema 122 can specify one or more operations to be performed. Schema 122 can also indicate entities and attributes with which those operations are to be performed.

In some embodiments, graph query API call 120 may be bound for graph API 108. Graph API 108 can function to facilitate data exchanges with a data provider. Graph API 108 can service a number of data providers (and their graphs). Furthermore, graph API 108 can process multiple graph API calls, such as graph query API calls, in parallel. API gateway 104 may be a front-end facing service for graph API 108. API gateway 104 can first receive any incoming requests and apply one or more entitlement policies to those requests. Additionally, API gateway 104 can apply one or more entitlement policies to outbound responses to those requests. Entitlements enforcement plugin 106 may be used by API gateway 104 to determine when and which entitlements are to be enforced. For example, entitlements enforcement plugin 106 may be executed by API gateway 104. Entitlement policy plugin causes the first entitlement policy (e.g., a pre-enforcement entitlement policy) and/or the second entitlement policy (e.g., a post-enforcement entitlement policy) to be applied.

For example, API gateway 104 may receive graph query API call 120 and entitlements enforcement plugin 106 may determine whether one or more entitlement policies stored in entitlement policy data repository 140 are to be applied to graph query API call 120 and/or a response to graph query API call 120. Entitlements enforcement plugin 106 may analyze schema 122. Schema 122 may indicate one or more operations to be performed. In the illustrative example, the operation described is a query operation. For graph-based systems, the available operations include "query" operations, "mutation" operations, and "subscription" operations. As a corollary to RESTful API systems, the query operation functions similarly to the "get" operation in REST. For simplicity, the foregoing will be described with reference to query operations, however persons of ordinary skill in the art will recognize that alternative operations may be applied.

Entitlements enforcement plugin 106 may determine, based on schema 122 and/or client device 110, that a first entitlement policy is to be applied to graph query API call 120. Entitlements enforcement plugin 106 may be configured to retrieve the first entitlement policy from entitlement policy data repository 140. For example, entitlements enforcement plugin 106 may determine that a pre-enforcement entitlement policy is to be applied to graph query API call 120 and may retrieve the pre-enforcement entitlement policy from one or more pre-enforcement policies 142 of entitlement policy data repository 140. In some embodiments, entitlements enforcement plugin 106 may determine, based on schema 122 and/or client device 110, that a second entitlement policy is to be applied to a response to graph query API call 120. Entitlements enforcement plugin 106 may be configured to retrieve the second entitlement policy from entitlement policy data repository 140. For example, entitlements enforcement plugin 106 may determine that a post-enforcement entitlement policy is to be applied to the response to graph query API call 120 and may retrieve the post-enforcement entitlement policy from a post-enforcement policies 144 of entitlement policy data repository 140.

Figure 2:
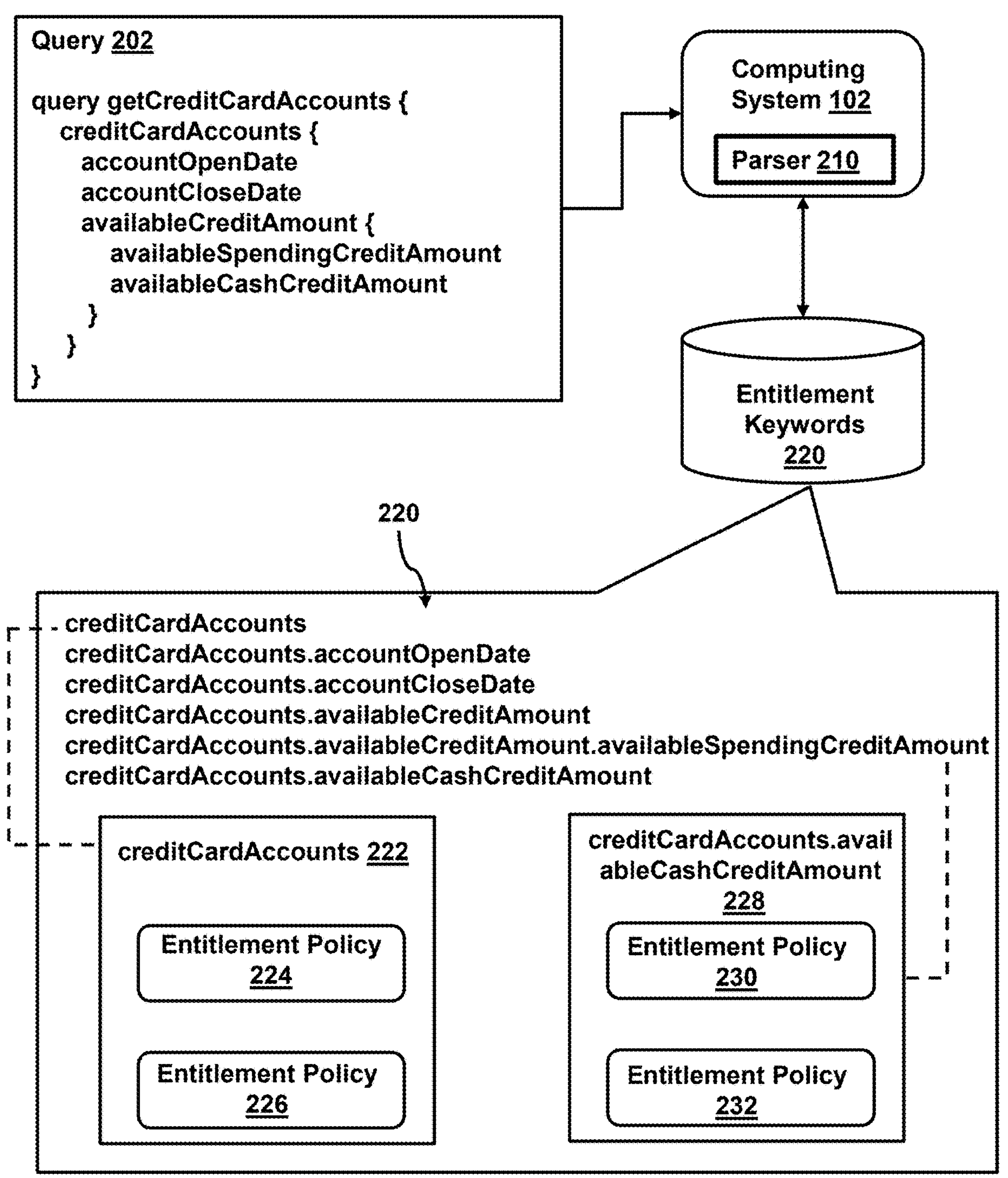
FIG. 2 shows an illustrative diagram for identifying entitlement keywords, in accordance with one or more embodiments.

In some embodiments, the enforcement policies to be applied to a given request and/or response to the request may be based on the schema. For example, the schema may specify a query format for querying one or more graphs. As an example, with reference to FIG. 2, system a query 202 may specify one or more entities to query (e.g., "creditCardAccounts"), and one or more attributes of each entity for which to retrieve data (e.g., "accountOpenDate," "accountCloseDate," "availableCreditAmount"). In some examples, an attribute may, itself, refer to another entity. For example, "availableCreditAmount" is an attribute of "creditCardAccounts," however it is also its own entity with its own attributes, "availableSpendingCreditAmount" and "availableCashCreditAmount." Computing system 102 may include a parser 210 configured to parse query 202, identify schema keywords, and determine whether any of those schema keywords correspond to entitlement keywords, which may indicate entitlement rules to be retrieved from entitlement policy data repository 140.

Parser 210 may execute one or more natural language processes to query 202 to identify schema keywords. For example, keyword spotting functionalities, machine learning models, and the like, may identify strings of text within query 202 and map those strings of text to programming syntax. Parser 210 may, for example, identify schema keywords, such as text of the operation to be performed. In the illustrative example, parser 210 may identify that query 202 includes a query operation based on recognition of the text string "query." In some embodiments, parser 210 may identify schema keywords including entities and attributes. In the illustrative example, parser 210 may identify schema keywords representing entities (e.g., "creditCardAccounts"), and attributes (e.g., "accountOpenDate," "accountCloseDate," "availableCreditAmount"). Furthermore, parser 210 may determine whether an attribute refer to another entity (e.g., "availableCreditAmount" is an attribute of "creditCardAccounts," as well as an entity with attributes, "availableSpendingCreditAmount" and "availableCashCreditAmount").

In some embodiments, computing system 102, including parser 210, may determine entitlement keywords corresponding to some or all of the schema keywords. For example, entitlement keywords 220 may be structured as a list of entitlement keywords. Each entitlement keyword may be associated with one or more entitlement policies. For example, entitlement keywords 220 may include a first entitlement keyword 222 (e.g., "creditCardAccounts") and a second entitlement keyword 228 (e.g., "creditCardAccounts.availableCashCreditAmount"). First entitlement keyword 222 may be associated with entitlement policies 224 and 226. Second entitlement keyword 228 may be associated with entitlement policies 230 and 232. In some examples, two or more entitlement keywords may be associated with a same entitlement policy. The entitlement policies associated with entitlement keywords 220 may include pre-enforcement entitlement policies and/or post-enforcement entitlement policies. Pre-enforcement entitlement policies refer to rules applied prior to data exchange. Post-enforcement entitlement policies refer to rules applied to response payloads prior to being provided to a client device.

In some embodiments, a determination of which entitlement policies are to be selected and applied may be performed by computing system 102. This determination may be based on the entitlement keywords recognized to match schema keywords from the input schema. For example, if the schema includes text representing first entitlement keyword 222, computing system 102 may determine that entitlement policies 224 and 226 are to be retrieved and applied. In some cases, a schema keyword may be determined to match an entitlement keyword based on a semantic similarity score computed between the schema keyword and the entitlement keyword. If the semantic similarity score exceeds a threshold semantic similarity score, then this indicates that the schema keyword matches the entitlement keyword. In some examples, for each schema keyword identified in the schema, a semantic similarity score may be computed between the schema keyword and each entitlement keyword of entitlement keywords 220. The semantic similarity scores may be analyzed to determine how similar each schema keyword is to each entitlement keyword. Based on the semantic similarity scores that are determined to be greater than or equal to the threshold semantic similarity score, one or more entitlement keywords may be identified, and one or more entitlement policies may be selected.

Figures 3A, 3B:
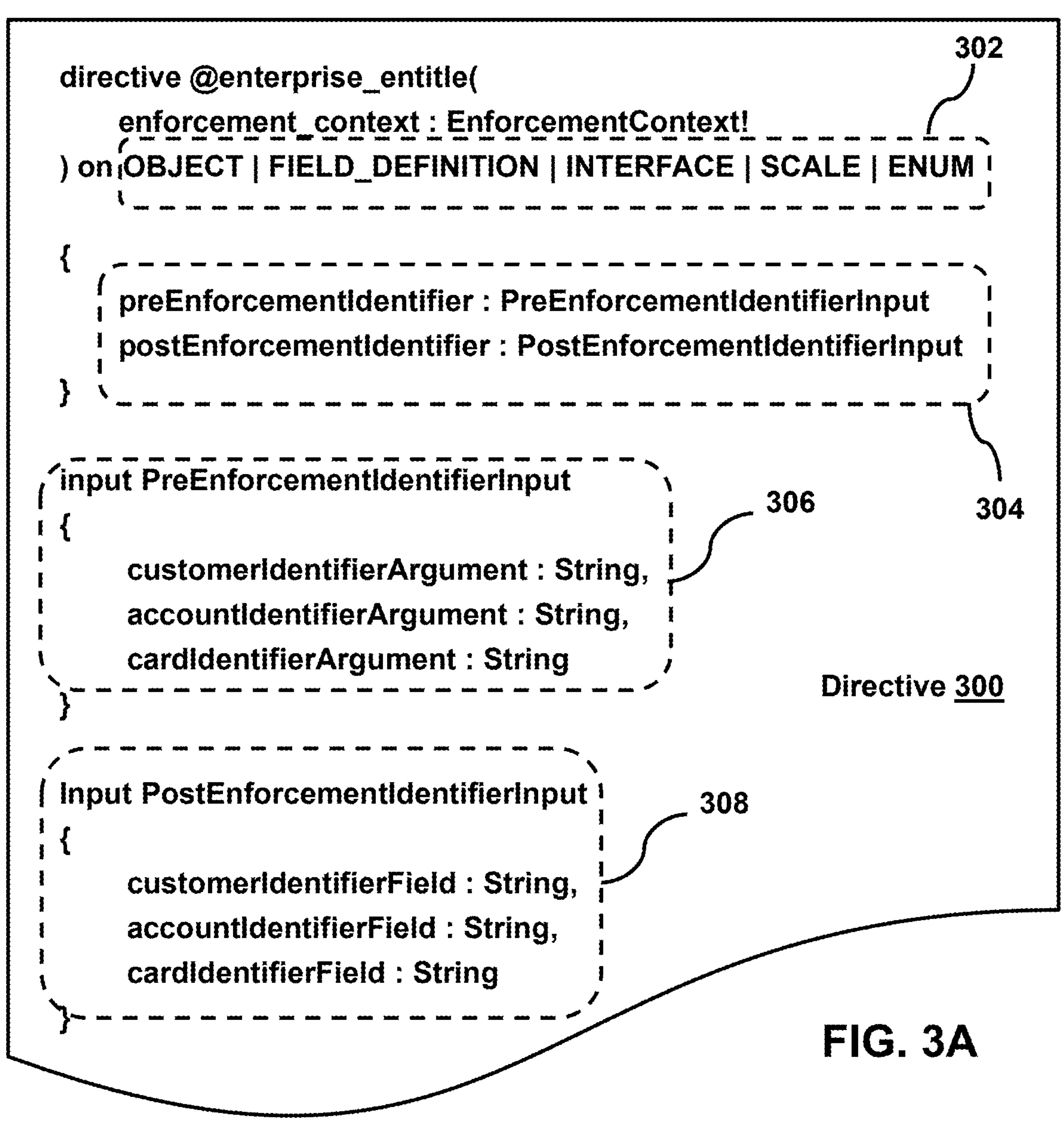
FIG. 3A-3B show illustrative diagrams of an example directive for entitlement enforcement and an example data product, in accordance with one or more embodiments.

FIGS. 3A and 3B illustrate an example entitlement enforcement directive 300 and an example data product 320, respectively, in accordance with one or more embodiments. Directive 300 of FIG. 3A describes how the entitlement enforcement policies will be applied at runtime. Entitlement enforcement directive 300 includes arguments indicating the data types that the entitlement enforcement policies will be applied. As seen in FIG. 3A, argument 302 indicates metadata for computing system 102 (e.g., API gateway 104) to identify and apply, as prescribed, the appropriate entitlements. In the example, argument 302 indicates that the entitlement enforcement directive is to apply to the following data types: OBJECT, FIELD_DEFINTION, INTERFACE, SCALAR, ENUM. At runtime, upon receiving a request, such as graph query API call 120 of FIG. 1, computing system 102 (e.g., entitlements enforcement plugin 106 of API gateway 104) can analyze metadata associated with the request to determine whether any entitlement policies will need to be applied and to which entities/attributes.

Also included in entitlement enforcement directive 300 is input type 304. Input type 304 allows a corresponding data provider, such as data provider 130 of FIG. 1, to define information needed to apply pre-enforcement entitlement policies and/or post-enforcement entitlement policies. Input type 306 describes the pre-enforcement entitlement policies and input type 308 describes the post-enforcement entitlement policies. In some embodiments, both pre-enforcement and post-enforcement entitlement policies may be applied to a same request/response data exchange. Input type 306 indicates one or more arguments of an operation to be evaluated for applying pre-enforcement entitlement policies. Similarly, input type 308 indicates a response field name to be evaluated for applying post-enforcement entitlement policies.

FIG. 3B illustrates a data product 320. Data product 320 is a representation of data within a graph. Each data product may include a name, an identifier, one or more entities (particular sub-graphs that are to be accessed), and, for each entity, one or more attributes (lowest-level data to be retrieved). In the example of data product 320, the data product may have a name (e.g., "Deposit Account"). To access data product 320, a key may be needed. The key refers to a string uniquely identifying data product 320 within the graph. In the example of FIG. 3B, data product 320 includes two entities (e.g., "Deposit Account Servicing Information" and "Deposit Account Balance"). Each entity may include one or more attributes (e.g., entity "Deposit Account Servicing Information," "Account Purpose" and "Account Nickname," while entity "Deposit Account Balance" may include attributes "Available Balance," "Collected Balance," and "Ledger Balance"). Different numbers of entities and attributes may be included and the aforementioned is merely illustrative.

When submitting a request, such as graph query API call 120 of FIG. 1, client device 110 can specify the particular entities 124*a*, 124*b*, and attributes 126*a*-126*b*, 128*a*-128*b*, to be accessed. Entitlements enforcement plugin 106 may reference entitlement enforcement directive 300 to determine whether to authorize some or all of graph query API call 120 and/or a response payload responding to graph query API call 120.

In some embodiments, one or more entitlement policies may be selected, retrieved, and applied based on client device 110. This may include selecting entitlement policies based on a device type of client device 110, selecting entitlement policies based on a user type, selecting entitlement policies based on account type, or other criteria.

In some examples, an entitlement policy may be selected based on the device type of client device 110. Upon receiving graph query API call 120 from client device 110, computing system 102 may be configured to extract device identification information about client device 110. For example, a header of graph query API call 120 may indicate a device identifier of client device 110 (e.g., a serial number, MAC address, etc.). In some embodiments, the device type may be determined based on the device identifier. For example, the device identifier may indicate whether client device 110 corresponds to a mobile device (e.g., via a mobile application), a computer (i.e., a web browser), or another type of device (e.g., an IoT device, a server, etc.).

Different device types may have different entitlements. For example, certain attributes may not be authorized to be provided to mobile devices. Thus, an entitlement policy preventing those attributes from being provided in responses to requests received from mobile devices may be selected and applied.

In some embodiments, the entitlement policies to be applied to graph query API call 120 and/or response 150 to graph query API call 120 may be selected based on whether client device 110 is associated with an authorized account with computing system 102. Computing system 102 may be associated with a service provider offering one or more services (e.g., cloud computing, social networking, financial services, etc.). In some cases, users may register with the service provider to access some or all of those services. Registration with the service provider may include generating an authorized account with the service provider. The service provider can store information about the user, including information about client device 110 for accessing the services. Parameters associated with the authorized account may indicate which, if any, entitlement policies to apply. For example, the authorized account may instruct entitlements enforcement plugin 106 to enforce a particular pre-enforcement entitlement policy to all inbound requests. As another example, the authorized account may instruct entitlements enforcement plugin 106 to enforce a particular post-enforcement entitlement policy to all output responses.

In some embodiments, the authorized account may be associated with multiple users. These users may have the same or different entitlements. For example, the authorized account may be associated with a first user having first data access authorizations and a second user having second data access authorizations. A first entitlement policy (e.g., a pre-enforcement entitlement policy) and/or a second entitlement policy (e.g., a post-enforcement entitlement policy) can be selected for application to a request and/or a response to the request based on the first data access authorizations of the first user and the second data access authorizations of the second user. Allowing different entitlements for different users can prevent certain users from performing certain actions while also allowing those users to perform other actions.

In some embodiments, API gateway 104 may receive, from client device 110, an additional graph query API call comprising a separate schema. This separate schema may specify one or more non-query operations to be performed. In some embodiments, as mentioned previously, different client devices and/or authorized accounts associated with those client devices, may have different authorization privileges. Depending on the privileges associated with client device 110, certain operations may be authorized, and certain operations may not be authorized. For example, query operations may be authorized for client device 110, whereas mutation operations may not be authorized. In some examples, client device 110 may lack authorization from executing non-query operations (e.g., mutations, subscriptions). In such examples, entitlements enforcement plugin 106 may, via API gateway 104, prevent the additional graph query API from being provided to graph API 108 based on the separate schema specifying the non-query operations to be performed.

In some embodiments, a determination may be made, based on schema 122, whether multiple operations are specified. Different queries, for example, may be directed at different entities. Each entity may be represented using their own entity graph (also referred to interchangeably as a sub-graph). For example, schema 122 may include a first sub-query directed to a first entity graph associated with a first entity (e.g., entity 124*a*) and a second sub-query directed to a second entity graph associated with a second entity (e.g., entity 124*b*). API gateway 104 may recognize the first and second sub-queries and determine, using entitlements enforcement plugin 106, whether any entitlement policies are to be applied to the sub-queries or to response payloads for those sub-queries. For example, the first entitlement policy to be applied to schema 122 may correspond to a pre-enforcement entitlement policy. The pre-enforcement entitlement policy may be selected from pre-enforcement policies 142 based on the entities to be queried (e.g., entity 124*a*, 124*b*), their attributes (e.g., attributes 126*a*-126*b*, 128*a*-128*b*), the operations to be performed, an authorized account associated with client device 110, a device type of client device 110, or other criteria, or combinations thereof. In some embodiments, the first entitlement policy being applied to schema 122 may correspond to applying the first entitlement policy to the first sub-query, the second sub-query, or both the first and second sub-queries.

In some examples, different sub-queries may be directed to different entity graphs. For example, if a first sub-query is associated with a first entity, the query may specify the sub-graph associated with the first entity. Similarly, another sub-query directed to a second entity may specify the sub-graph associated with the second entity that is to be accessed.

In some embodiments, entitlements enforcement plugin 106 of computing system 102 may be configured to generate an updated graph query API call by entitling schema 122. Entitling schema 122 produces an entitled schema. The entitled schema includes one or more entitlement rules defining the entitlement policy. For example, the entitlement policy may include a rule indicating that client device 110 is authorized to query an entity 124*a*. The same or another entitlement policy may also include a rule indicating that client device 110 is to be prevented, for example, based on a lack of authorization, from querying an entity 124*b*. In some embodiments, an entitlement policy may be applied to an attribute. For example, client device 110 may be authorized to query entity 124*a* and entity 124*b* for attributes 126*a*, 126*b*, but lacks authorization to query entity 124*a* and entity 124*b* for attributes 128*a*, 128*b*. In some embodiments, upon application of the first entitlement policy, the updated graph query API call may be provided to graph API 108 via API gateway 104.

Graph API 108 may facilitate a data exchange with data provider 130. For example, data provider 130 may store graph 134 via provider database 132. Graph 134 may be associated with entity 124*a*. For example, graph 134 may include an interconnected network of nodes storing data representing values of different attributes of entity 124*a*, such as attributes 126*a*, 128*a*. In some examples, graph 134 may, itself, include one or more sub-graphs, where each sub-graph is related to an entity.

In some embodiments, a response payload may be received by graph API 108 from data provider 130. API gateway 104 may receive the response payload from graph API 108 and, using entitlements enforcement plugin 106, may determine and/or apply one or more entitlement policies to the response payload. As mentioned above, a second entitlement policy may be identified to be applied to the response payload. Although the previous description indicates that a second entitlement policy—to be applied to the response to the graph query API call—may be determined prior to data exchanges with data provider 130, some examples include determining the second entitlement policy and/or additional entitlement policies to be applied to the response to the graph query API call upon receipt of the response payload.

In some embodiments, the second entitlement policy may be a post-enforcement entitlement policy stored in post-enforcement policies 144 of entitlement policy data repository 140. Post-enforcement entitlement policies may indicate which data can be shared with client device 110. For example, the response payload of the response to graph query API call 120 may include first data associated with attribute 126*a* of first entity 124*a* and data associated with attribute 128*a* of entity 124*a*.

In some embodiments, the second entitlement policy may indicate that client device 110 is authorized to view the first data associated with attribute 126*a* of entity 124*a*. Some embodiments include the second entitlement policy indicating that client device 110 is prevented from viewing the second data associated with attribute 128*a* of entity 124*a*.

After the second entitlement policy has been applied to the response payload, generating an updated response payload 152, API gateway 104 may generate and provide, to client device 110, a response 150 including updated response payload 152. For example, updated response payload 152 may include the first data associated with attribute 126*a*. The second entitlement policy may prevent the second data associated with attribute 128*a* from being included in updated response payload 152 so that it is not provided with response 150 to client device 110.

In some embodiments, a determination may be made, based on schema 122, that one or more post-enforcement entitlement policies are to be applied to some or all of the data included in the response payload. For example, the second entitlement policy may indicate that the first data and the second data have different entitlements. In this particular example, the second entitlement policy may indicate that, based on schema 122 and client device 110, the first data is authorized to be included in response 150 (via updated response payload 152), however the second data is not authorized to be included in response 150. In some embodiments, preventing the second data from being included in response 150 may include removing the second data from the response payload to generate updated response payload 152. In some embodiments, preventing the second data from being included in response 150 may include masking or otherwise obfuscating the second data such that it is not accessible to client device 110.

The second entitlement policy may be selected for application based on schema 122. For example, computing system 102 can determine that attribute 128*a* is represented by text corresponding to an entitlement keyword. Based on this determination, the second entitlement policy may be selected for application to the response payload. As mentioned above, determining that schema 122 includes an entitlement keyword may include parsing schema 122 to identify schema keywords. These schema keywords can be compared to predefined entitlement keywords (e.g., entitlement keywords 220 of FIG. 2) to determine which match. The entitlement policies predefined as being associated with those entitlement keywords may then be applied to the schema to generate the entitled schema. The entitled schema may indicate to API gateway 104 that certain data included in a response payload should be prevented from including in a response to a given API call.

In some embodiments, API gateway 104 may receive a plurality of graph API calls for graph API 108. These graph API calls may include graph query API calls, such as graph query API call 120. The graph API calls may be received from various client devices. For example, a plurality of clients may submit the graph API calls to graph API 108, which may be received at API gateway 104 for entitlements enforcement plugin 106 to enforce entitlement policies. The graph API calls may be continuous and voluminous In some embodiments, determination that entitlement policies are to be applied at graph query API call 120 or response 150 may be based on each graph API call. For example, computing system 102 may determine, based on schema 122, that the requested query operation requests secure information. This determination may be based on the entitlement keywords identified in the schema keywords. For example, entity 124*b* may be associated with secure information (e.g., user biometric data, user financial data, user health data, etc.). Based on entity 124*b* being recognized as being associated with secure information, entitlements enforcement plugin 106 may be configured to select, for retrieval and application, the first entitlement policy and/or the second entitlement policy.

In some embodiments, graph query API call 120 may be prevented, via entitlements enforcement plugin 106 and API gateway 104, from being provided to graph API 108 prior to the first entitlement policy being applied. This may be based on the query operations requesting the secure information. Thus, the first entitlement policy can prevent unauthorized requests being provided to graph API, reducing data traffic and computing resources. For example, the more requests directed to graph API 108, the more computing resources (e.g., cloud-compute instances, servers, processors, etc.) that are needed. Reducing the number of requests by preventing those requests requesting unauthorized secure information reduces the computing load of graph API 108. This advantageously delivers responses, such as response 150, faster and with less likelihood of error/timeout.

In some embodiments, graph query API call 120 may be prevented, via entitlements enforcement plugin 106 and API gateway 104, from being provided from graph API 108 to client device 110 based on the first data and/or the second data including the secure information prior to application of the second entitlement policy. Thus, the second entitlement policy can prevent unauthorized data being provided to client device 110, which further reduces data traffic and computing resources. For example, the more responses output from graph API 108, the more computing resources (e.g., cloud-compute instances, servers, processors, etc.) that are needed. Reducing the number of responses by preventing those response payloads including unauthorized secure information reduces the computing load of graph API 108. This also advantageously delivers responses, such as response 150, faster and with less likelihood of error/timeout.

In some embodiments, certain graph query API calls may be prevented from being forwarded to graph API 108. For example, if the graph query API call requests secure information. Other graph query API calls received by API gateway 104 may be provided to graph API 108. In these examples, at least the first entitlement policy can be prevented from being applied to each other graph query API call requesting including secure information.

In some embodiments, the entitled schema includes authorization for another entity, such as a third entity (i.e., where entities 124*a*-124*b* correspond to a first and second entity, respectively) to be queried. The third entity may not have any pre-enforcement entitlement policies associated with it. Therefore, the entitled schema indicates that two query operations can be performed via the graph API 108: a first sub-query may be provided to a first data provider associated with the first entity and a second sub-query to a second data provider associated with the third entity.

In some embodiments, as response payload from the first entity, a first sub-graph may be retrieved from the first data provider. Similarly, as a separate response payload from the third entity, a second sub-graph may be retrieved from the second data provider. The entitled schema may include instructions to form a super-graph by joining the first sub-graph and the second sub-graph. The first sub-graph may store data associated with the first entity. The second sub-graph may store data associated with the third entity. The first data that may then be retrieved from the created super-graph.

In some embodiments, computing system 102 may receive, from a data provider associated with the first entity (e.g., data provider 130), prior to receiving graph query API call 120, a data provider schema specifying entities and attributes stored by a first sub-graph of the data provider. Each data provider may submit a data product schema, referred to interchangeably as a data provider schema or a data provider specific schema, to specify which entitlements are to be enforced on which objects (e.g., entities, attributes, etc.). At runtime, when graph query API call 120 is received from client device 110, computing system 102, via entitlements enforcement plugin 106, may compare a format of schema 122 to a format of the data provider schema. A format of schema 122 can be pre-defined and agreed to by data provider 130 and client device 110 prior to data exchanges. Using specific operations, such as the query operation, schema 122 may access one or more graph endpoints of one or more graphs of data provider 130.

In some examples, prior to graph query API call 120 being received, a data-provider-specific schema, also referred to herein as a data product schema, indicating entities and attributes stored using a sub-graph of a given data provider, may be received from each data provider. Schema 122 of graph query API call 120 can be compared to the data-provider-specific schema to determine the set of entitlement policies. As an example, with reference to FIG. 4A, a data product schema 400 is displayed. Data product schema 400 may use a query operation as an entry point to access the requested data, such using a query 432 (e.g., "getDepositAccounts") and a query 434 (e.g., "getDepositAccount (accountReferenceId: String)"). The particular entity with which queries 432-434 whose sub-graph is to be accessed, may correspond to an entity 402 (e.g., "DepositAccount"). In the illustrative example, query 432 can request all deposit accounts associated with entity 402. In some examples, entity 402 may be specified using a leaf node identifier 404, as seen in query 434. Leaf node identifier 404 can correspond to an identifier of a leaf node in the sub-graph for entity 402.

Data product schema 400 may also include a set of attributes associated with entity 402 (as well as any other entities requested). For example, entity 402 may include an attribute 406 (e.g., "accountReferenceId"), an attribute 408 (e.g., "depositAccountServicingInformation"), an attribute 410 (e.g., "depositAccountBalance"), or other attributes. Each of attributes 406-410 may be a value or another entity. For example, attribute 406 may reference a first value, which may correspond to the lowest unit of data available in the sub-graph for entity 402. On the other hand, attribute 408 and attribute 410 are each their own entity, as described in data product schema 400.

Attribute 408 may correspond to an entity 412. Entity 412 may include one or more attributes, such as, for example, attribute 414 (e.g., "accountPurpose") and attribute 416 (e.g., "accountNickname"). Attribute 414 and attribute 416 may each reference a value (e.g., "String") and thus refer to a leaf node in the graph. However, alternatively, one or more of attribute 414 and attribute 416 may correspond to another entity.

Attribute 410 may correspond to an entity 420. Entity 420 may include one or more attributes, such as, for example, attribute 422 (e.g., "availableBalance"), attribute 424 (e.g., "collectedBalance"), and attribute 426 (e.g., "ledgerBalance"). Attributes 422-426 may each reference a value (e.g., "Float") and thus refer to a leaf node in the graph. Differing from attributes 414-416, the value of attributes 422-426 may be numerical values as opposed to text, however this is exemplary. In some cases, one or more of attributes 422-426 may correspond to yet another entity. Data product schema 400 may function, as part of a request to computing system 102 (e.g., graph query API call 120), to call an endpoint based on the inclusion of the query operations (e.g., queries 432-434).

Figure 4A:
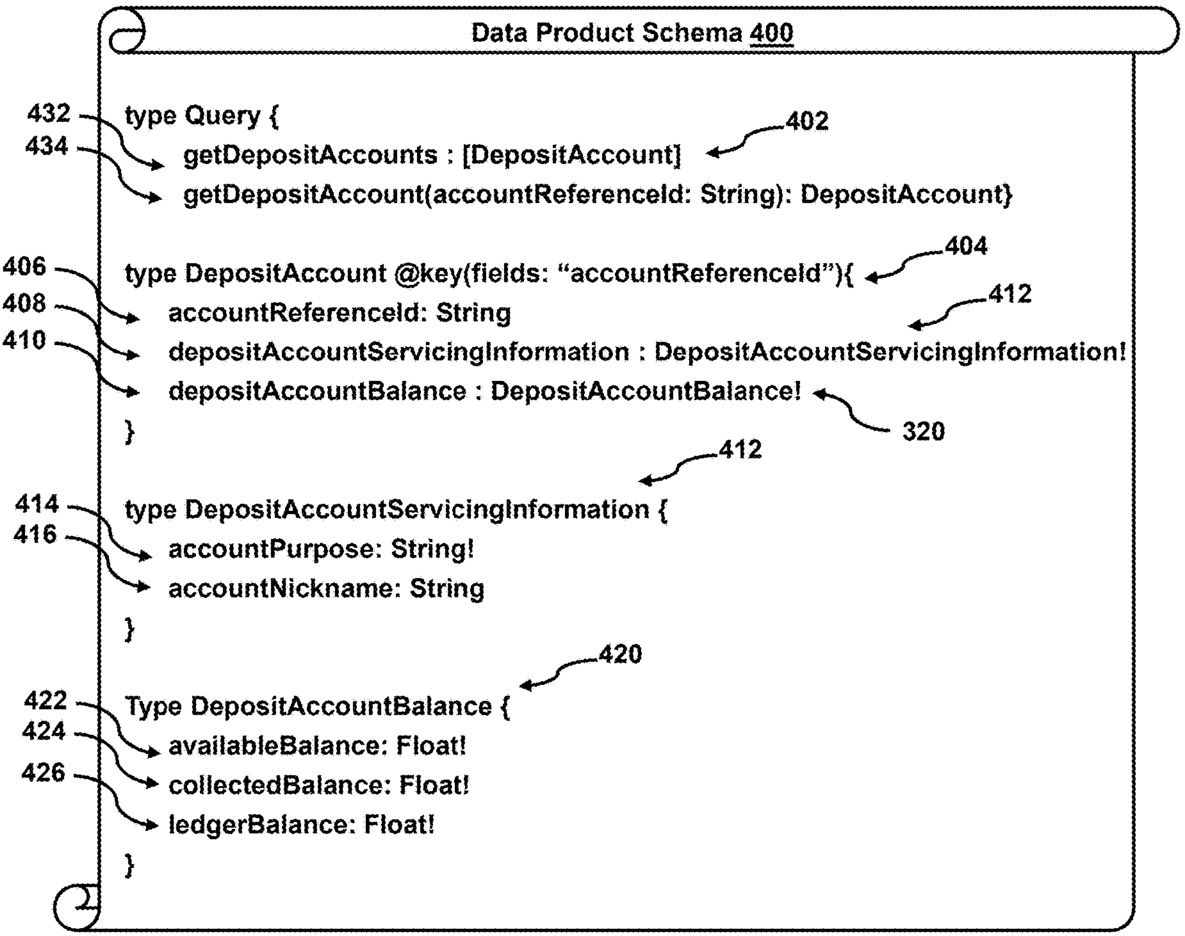
FIG. 4A-4B show illustrative diagrams of an example data product schema and an example entitled data product schema, in accordance with one or more embodiments.

In some embodiments, computing system 102 (e.g., via entitlements enforcement plugin 106) may transform data product schema 400 of FIG. 4A into an entitled version of the data product schema. As an example, with reference to FIG. 4B, entitled data product schema 450 represents data product schema 400 of FIG. 4A including entitlement policies 452, 454, and 456. As mentioned previously, queries in graphs call endpoints. In entitled data product schema 450, entitlement policy 452 may be applied as a post-enforcement entitlement policy to query 432. For example, entitlement policy 452 may allow the graph query API call corresponding to query 432 to be transmitted to the data provider to obtain all of the data (e.g., get all of the deposit accounts). However, a directive (e.g., directive 300 of FIG. 3A) can ensure that no data will be returned until entitlement policy 452 is applied. Similarly, entitlement policy 454 may be applied as a pre-enforcement entitlement policy to prevent query 434 (e.g., to get the deposit account for the account reference identifier specified) from being passed to graph API 108 and data provider 130 until entitlement policy 454 is applied.

In some cases, a query may have a pre-enforcement entitlement policy and a post-enforcement entitlement policy. For example, in FIG. 4B, query 434 may include entitlement policy 454 and entitlement policy 456. Entitlement policy 454 may refer to a pre-enforcement entitlement policy to be applied to query 434 prior to data being exchanged with graph API 108 and data provider 130. Entitlement policy 456 may refer to a post-enforcement entitlement policy to be applied to query 434 prior to some or all of the data being served to client device 110 as a response to query 432. In some embodiments, an operation (i.e., a query) can apply a pre-enforcement entitlement policy, a post-enforcement entitlement policy, or have both a pre-enforcement entitlement policy and a post-enforcement entitlement policy.

Figure 4B:
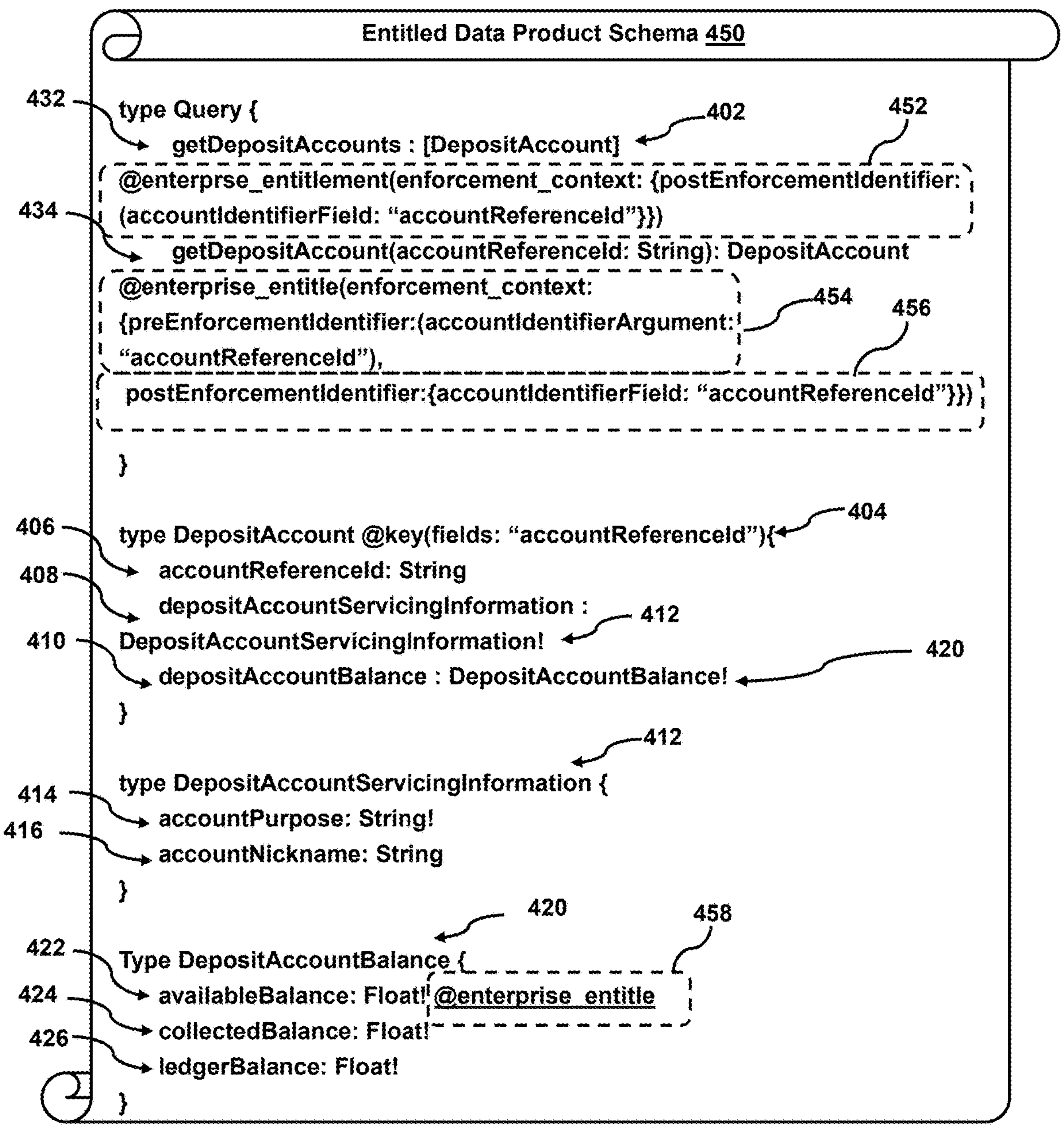

In some embodiments, entitlements can be applied to a lowest-data level. For example, as seen in FIG. 4B, an entitlement policy 458 may be applied to query 432. Depending on the requesting client device, as well as, or alternatively, other characteristics of the request, the value stored in the sub-graph of entity 420 corresponding to attribute 422 may be accessed/returned. For example, if client device 110 corresponds to a customer associated with the deposit account referenced by the lead node identifier "accountReferenceId," then entitlement policy 458 may indicate that the value of attribute 422 can be returned in a response. Alternatively, client device 110 may correspond to an agent accessing the deposit account of the customer that does not have authorization to access that data.

Figure 5A:
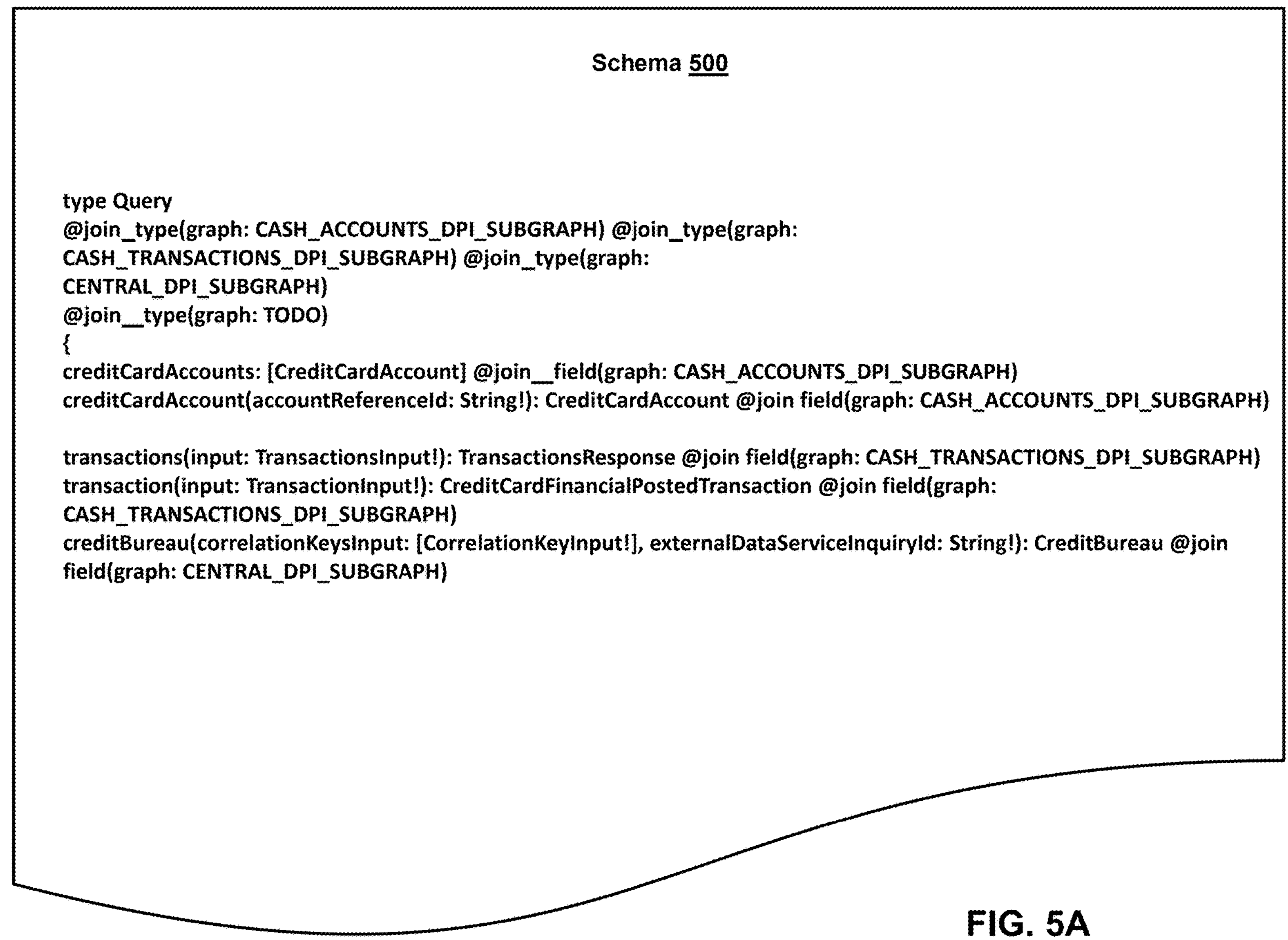
FIG. 5A-5C show illustrative diagrams of additional example data product schema including pre-enforcement entitlement policies and post-enforcement entitlement policies, in accordance with one or more embodiments.
Figure 5B:
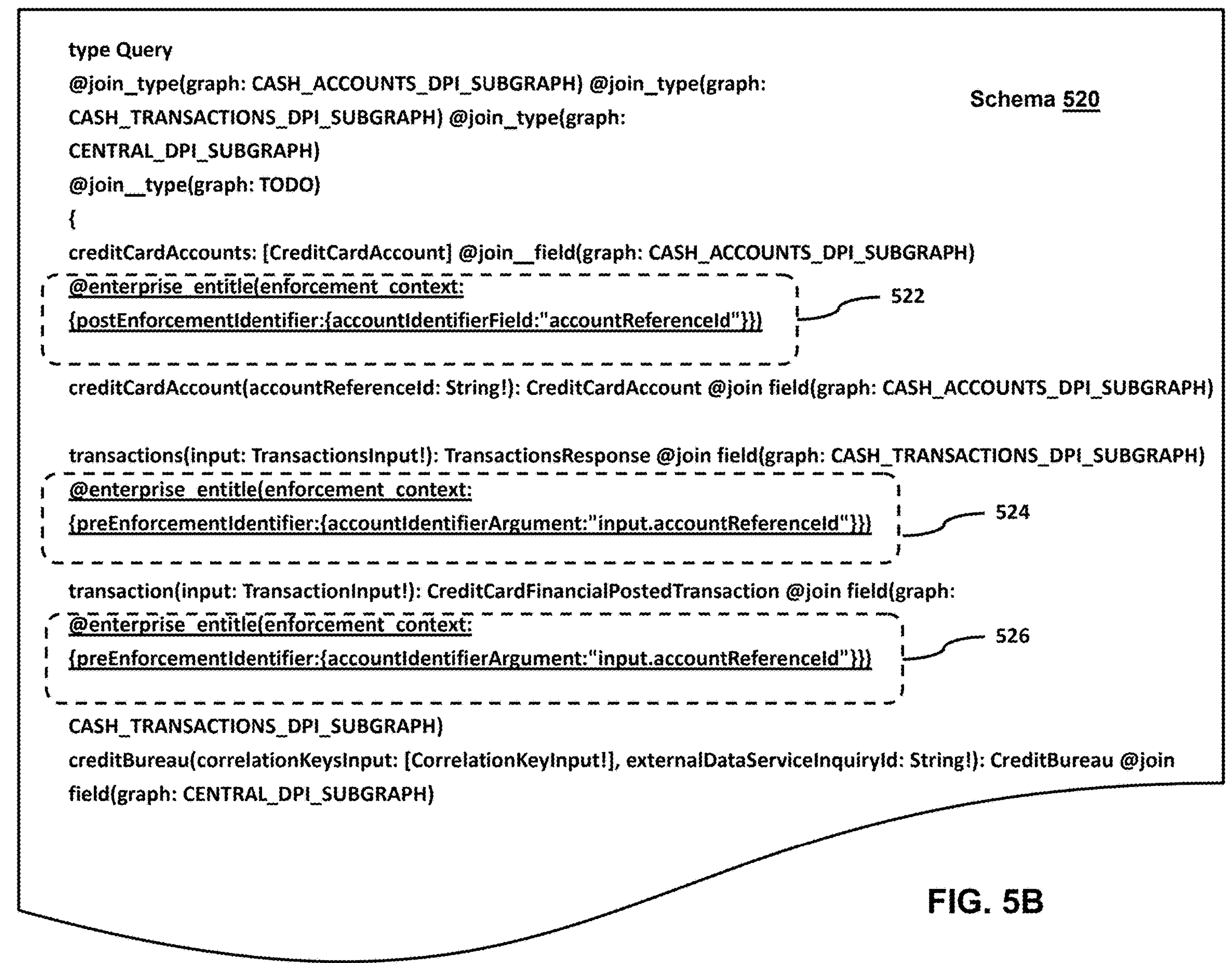
Figure 5C:
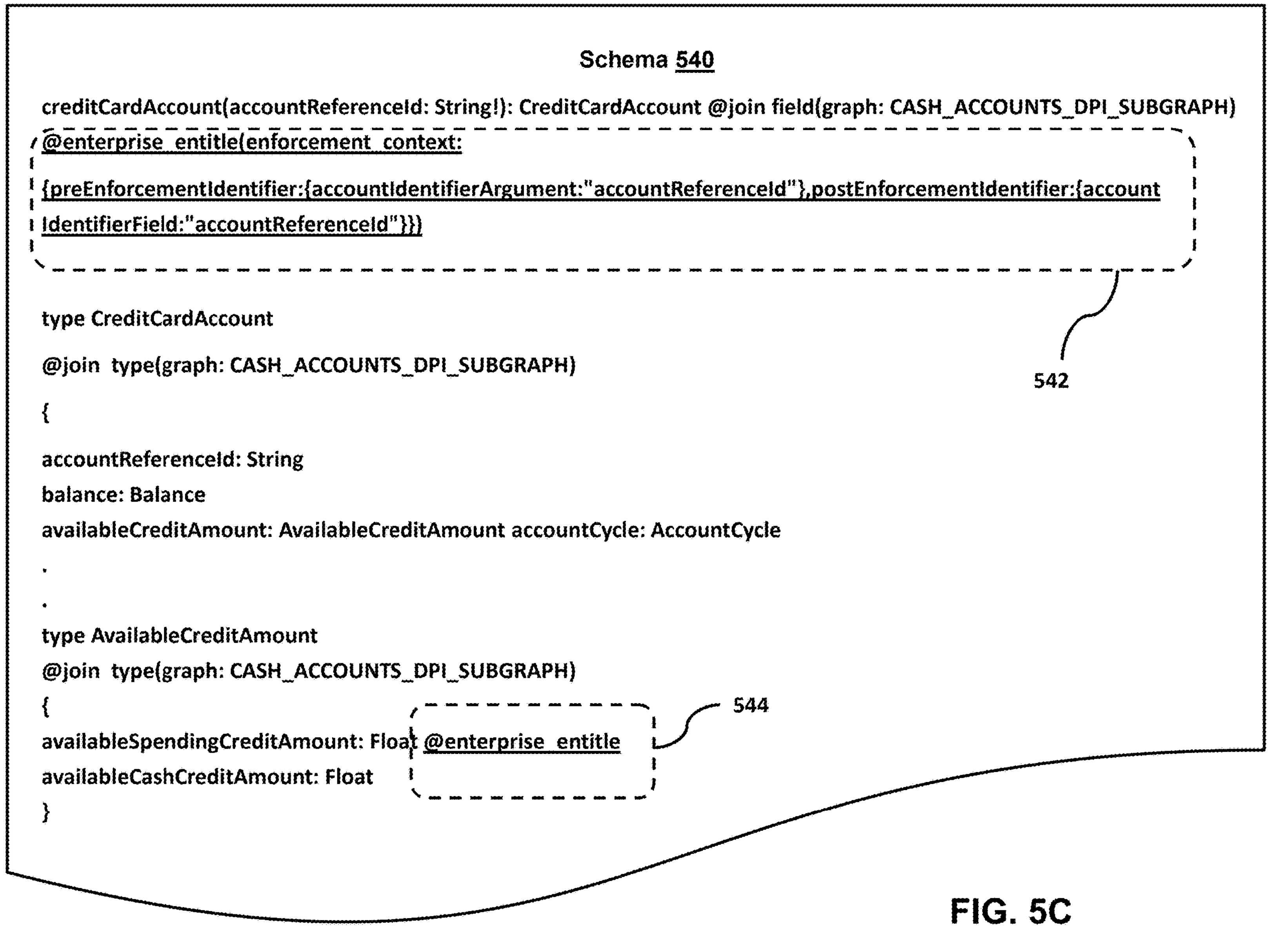

FIG. 5A-5C illustrate example schemas with and without entitlements, in accordance with one or more embodiments. FIG. 5A, for example, illustrates a schema 500. Schema 500 does not include any pre-enforcement entitlement policies and/or post-enforcement entitlement policies. Schema 500 may request creating a super-graph by joining multiple sub-graphs corresponding to different entities, and then executing query operations to retrieve data stored by the super-graph.

FIG. 5B includes schema 520 including entitlement policies. For example, schema 520 may include pre-enforcement entitlement policy 524 and pre-enforcement entitlement policy 526. For example, the pre-enforcement entitlement policies may prevent transaction details from being returned for flagged authorized accounts. Pre-enforcement entitlement policies 524-526 may prevent graph query API calls from being forwarded to their sub-graphs. In illustrative example, queries included in schema 520 may request data representing credit card transactions based on a card account provided within the graph query API call. Before returning the transaction details, entitlements enforcement plugin 106 of FIG. 1 can determine whether the authorized account associated with the request has been flagged (e.g., is in good standing for the requested customer) using pre-enforcement entitlements policies 524-526. Pre-enforcement entitlement policies 524-526, in addition to reducing network traffic by preventing requests from being forwarded to their sub-graphs. Additionally, pre-enforcement entitlement policies 524-526 can ensure that only an authorized user can access the data. In some examples, the query author can define the details based on which entitlements platform (e.g., entitlements enforcement plugin 106) would perform the check at runtime. The schema author should define where the authoritative customer/account context is available in the schema at design time. For example, the author of schema 520 can specify the authorized account and the specifics of the requestor such that entitlements enforcement plugin 106 can, at runtime to apply, the appropriate entitlements to reject or allow a graph query API call (e.g., graph query API call 120). In the example of FIG. 5B, schema 520 indicates that the graph's query operations are to be entitled based on a particular customer's authorized account (e.g., parameters associated with that account). Furthermore, the query operations are entitled prior to forwarding the graph API calls to a corresponding sub-graph.

Schema 520 also includes a post-enforcement entitlement policy 522. Post-enforcement entitlement policies may be applied to prevent certain data from being provided to a client device. The post-entitlement policies may prevent a response from being provided to a client device by rejecting the response from the sub-graph. For example, entitlements enforcement plugin 106 may cause API gateway 104 to reject the response payload from graph 134. As another example, entitlements enforcement plugin 106 may cause API gateway 104 to allow the response payload from graph 134 but redact or otherwise obfuscate at least some of the response payload. In the illustrative example FIG. 5B, post-enforcement entitlement policy 522 may act on the response payload from the sub-graph following a query request (e.g., the query requests all the credit card accounts for a given customer) to identify the authorized accounts that the customer is entitled to access, while also redacting all accounts the customer is not entitled to access.

The author of schema 520 can define where the entitlements should be such that entitlements enforcement plugin 106 can be applied to the response. Defining where the entitlements should be can enable entitlements enforcement plugin 106 to compare the decisions against the returned data (e.g., accounts) and redact portions of the data the customer is not authorized to access. Post-enforcement entitlement policy 522, as an example, can be selected based on the customer account context in the response and after the response payload has been received from each queried sub-graph.

There can be query operations that expose data in such a way that both pre-enforcement entitlement policies and post-enforcement entitlement policies may be needed. As an example, with reference to FIG. 5C, schema 540 may include pre- and post-enforcement entitlements checks 542. In such examples, data provider 130 (i.e., an owner of graph 134 being queried) can define the necessary contexts when preparing the schema. By doing so, the appropriate entitlements can be applied when a query is submitted. Furthermore, schema 540 can include an indication that a particular attribute of an entity is to have an entitlement policy applied thereto. For example, an entitlement policy 544 may be applied to a particular attribute within a queried sub-graph.

Figure 6:
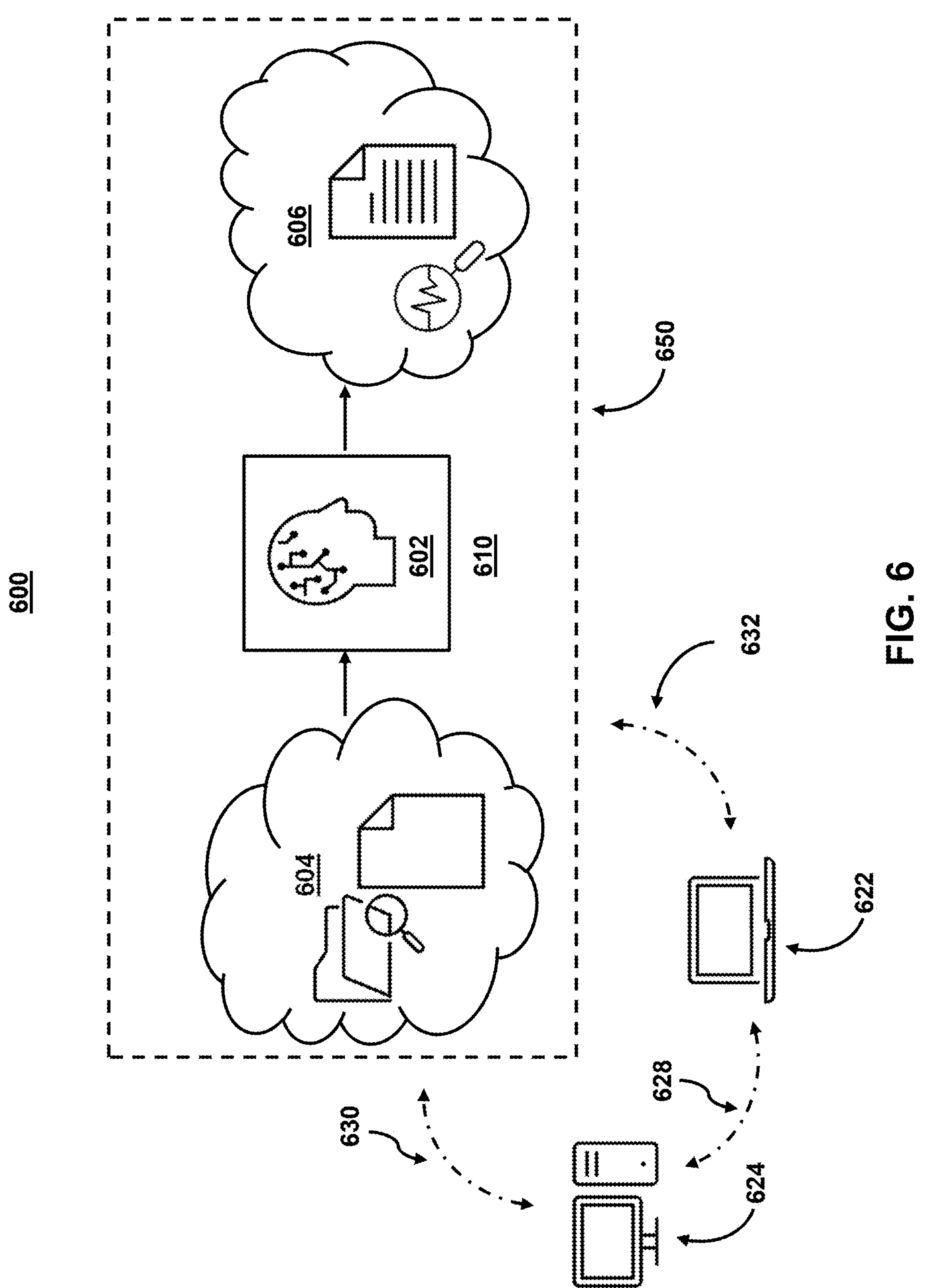
FIG. 6 shows illustrative components of a system used to enforce data-attribute level entitlements within a graph, in accordance with one or more embodiments.

FIG. 6 shows illustrative components of a system used to enforce attribute level entitlements within a super-graph, in accordance with one or more embodiments. For example, FIG. 6 may show illustrative components for enforcing attribute level entitlements within a super-graph. As shown in FIG. 6, system 600 may include mobile device 622 and user terminal 624. While shown as a smartphone and personal computer, respectively, in FIG. 6, it should be noted that mobile device 622 and user terminal 624 may be any computing device, including, but not limited to, a laptop computer, a tablet computer, a hand-held computer, and other computer equipment (e.g., a server), including "smart," wireless, wearable, and/or mobile devices. FIG. 6 also includes cloud components 610. Cloud components 610 may alternatively be any computing device as described above, and may include any type of mobile terminal, fixed terminal, or other device. For example, cloud components 610 may be implemented as a cloud computing system and may feature one or more component devices. It should also be noted that system 600 is not limited to three devices. Users may, for instance, utilize one or more devices to interact with one another, one or more servers, or other components of system 600. It should be noted, that, while one or more operations are described herein as being performed by particular components of system 600, these operations may, in some embodiments, be performed by other components of system 600. As an example, while one or more operations are described herein as being performed by components of mobile device 622, these operations may, in some embodiments, be performed by components of cloud components 610. In some embodiments, the various computers and systems described herein may include one or more computing devices that are programmed to perform the described functions. Additionally, or alternatively, multiple users may interact with system 600 and/or one or more components of system 600. For example, in one embodiment, a first user and a second user may interact with system 600 using two different components.

With respect to the components of mobile device 622, user terminal 624, and cloud components 610, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 6, both mobile device 622 and user terminal 624 include a display upon which to display data (e.g., conversational response, queries, and/or notifications).

Additionally, as mobile device 622 and user terminal 624 are shown as touchscreen smartphones, these displays also function as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 600 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically store information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 6 also includes communication paths 628, 630, and 632. Communication paths 628, 630, and 632 may include the Internet, a mobile phone network, a mobile voice, or data network (e.g., a 5G or LTE network), a cable network, a public switched telephone network, or other types of communications networks or combinations of communications networks. Communication paths 628, 630, and 632 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 610 may include computing system 102, entitlement policy data repository 140, data provider 130, or other components. Cloud components 610 may include model 602, such as a machine learning model used to identify entitlement keywords, etc. (which may be referred to collectively as "models" herein). Model 602 may take inputs 604 and provide outputs 606. The inputs may include multiple datasets, such as a training dataset and a test dataset. Each of the plurality of datasets (e.g., input type 304) may include data subsets related to user data, predicted forecasts and/or errors, and/or actual forecasts and/or errors. In some embodiments, outputs 606 may be fed back to model 602 as input to train model 602 (e.g., alone or in conjunction with user indications of the accuracy of outputs 606, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a class of computing tasks to be executed).

In a variety of embodiments, model 602 may update its configurations (e.g., weights, biases, or other parameters) based on the assessment of its prediction (e.g., outputs 606) and reference feedback information (e.g., user indication of accuracy, reference labels, or other information). In a variety of embodiments, where model 602 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 602 may be trained to generate better predictions.

In some embodiments, model 602 may include an artificial neural network. In such embodiments, model 602 may include an input layer and one or more hidden layers. Each neural unit of model 602 may be connected with many other neural units of model 602. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 602 may be self-learning and trained, rather than explicitly programmed, and can perform significantly better in certain areas of problem solving, as compared to traditional computer programs. During training, an output layer of model 602 may correspond to a classification of model 602, and an input known to correspond to that classification may be input into an input layer of model 602 during training. During testing, an input without a known classification may be input into the input layer, and a determined classification may be output.

In some embodiments, model 602 may include multiple layers (e.g., where a signal path traverses from front layers to back layers). In some embodiments, back propagation techniques may be utilized by model 602 where forward stimulation is used to reset weights on the "front" neural units. In some embodiments, stimulation, and inhibition for model 602 may be more free flowing, with connections interacting in a more chaotic and complex fashion. During testing, an output layer of model 602 may indicate whether a given input corresponds to a classification of model 602 (e.g., a data item is relevant to the computing task to be executed).

In some embodiments, the model (e.g., model 602) may automatically perform actions based on outputs 606. In some embodiments, the model (e.g., model 602) may not perform any actions. The output of the model (e.g., model 602) may be used to further update the model by generating updated training data, including the input request and the predicted classification (i.e., relevant/not relevant).

System 600 also includes API layer 650. API layer 650 may allow the system to generate summaries across different devices. In some embodiments, API layer 650 may be implemented on mobile device 622 or user terminal 624. Alternatively, or additionally, API layer 650 may reside on one or more of cloud components 610. API layer 650 (which may be a REST or Web services API layer) may provide a decoupled interface to data and/or functionality of one or more applications. API layer 650 may provide a common, language-agnostic way of interacting with an application. Web service APIs offer a well-defined contract, called WSDL, that describes the services in terms of their operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 650 may use various architectural arrangements. For example, system 600 may be partially based on API layer 650, such that there is strong adoption of SOAP and RESTful Web-services, using resources like Service Repository and Developer Portal, but with low governance, standardization, and separation of concerns. Alternatively, system 600 may be fully based on API layer 650, such that separation of concerns between layers like API layer 650, services, and applications is in place.

In some embodiments, the system architecture may use a microservice approach. Such systems may use two types of layers: Front-End Layer and Back-End Layer where microservices reside. In this kind of architecture, the role of the API layer 650 may provide integration between Front-End and Back-End. In such cases, API layer 650 may use RESTful APIs (exposition to front-end or even communication between microservices). API layer 650 may use AMQP (e.g., Kafka, RabbitMQ, etc.). API layer 650 may use incipient usage of new communications protocols such as gRPC, Thrift, etc.

In some embodiments, the system architecture may use an open API approach. In such cases, API layer 650 may use commercial or open-source API Platforms and their modules. API layer 650 may use a developer portal. API layer 650 may use strong security constraints applying WAF and DDoS protection, and API layer 650 may use RESTful APIs as standard for external integration.

As another example, instead of using RESTful APIs, a GraphQL API may be used, as mentioned above. Differing from RESTful systems, GraphQL can specify a single endpoint to provide requests. GraphQL uses a schema to indicate the different types of data that is included in a given sub-graph, the relationships of that data, and operations that can be performed on the data. The operations include, for example, query operations to retrieve data, mutation operations to modify data, and subscription operations.

Figure 7:
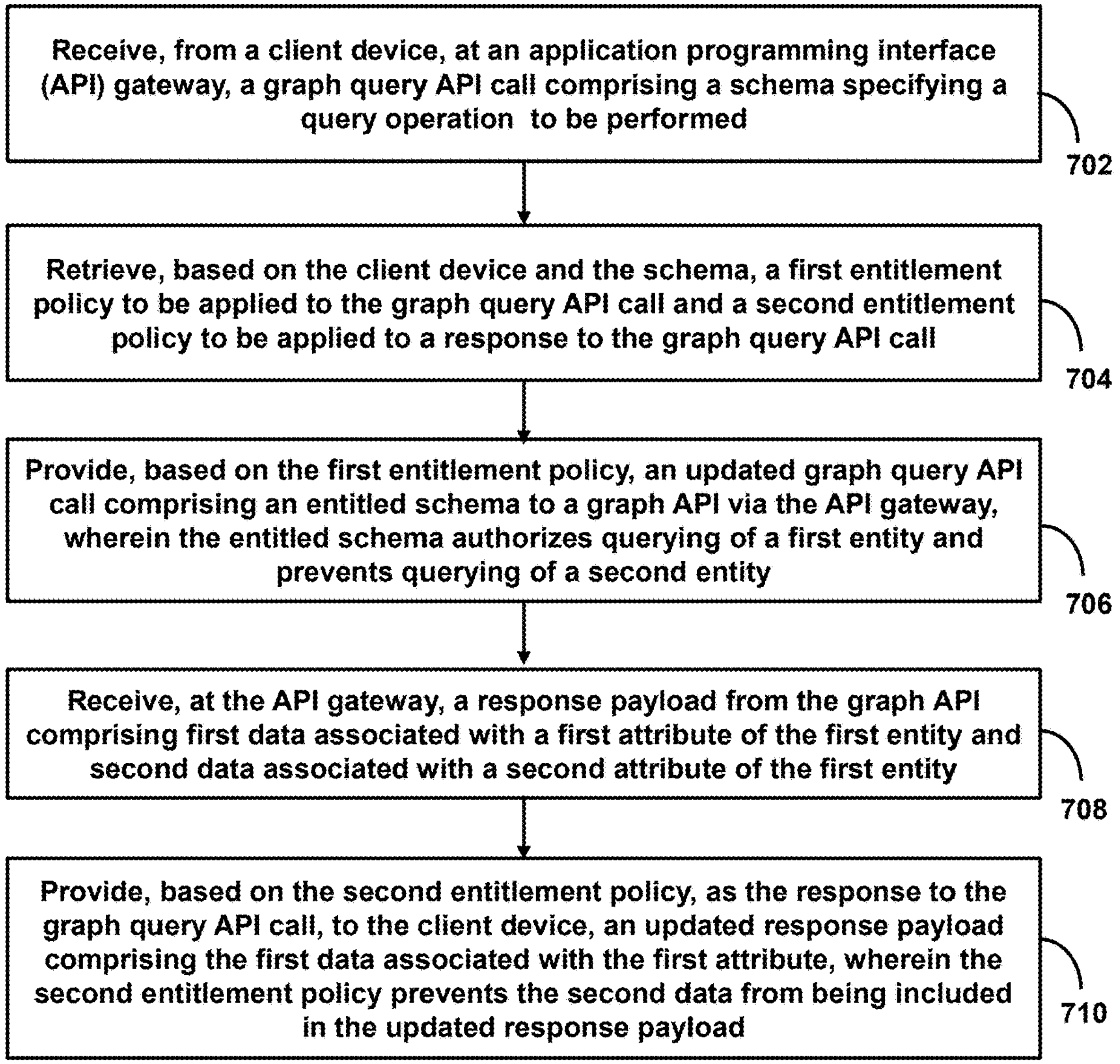
FIG. 7 shows an illustrative flowchart of an example process for enforcing data-attribute level entitlements within a graph, in accordance with one or more embodiments.

FIG. 7 shows a flowchart of a process 700 including steps involved in enforcing attribute level entitlements within a super-graph, in accordance with one or more embodiments. For example, system 100 of FIG. 1 and/or system 600 of FIG. 6 may use process 700 (e.g., as implemented on one or more system components described above) in order to facilitate enforcement of attribute level entitlements within a super-graph.

At step 702, a graph query API call including a schema specifying a query operation to be performed may be received. For example, computing system 102 may receive, from client device 110, at API gateway 104, graph query API call 120 including schema 122. The query operation may specify any sub-graphs to be accessed based on entities and attributes included in schema 122. In some examples, the schema may include information about client device 110, such as a device identifier (to determine device type), a user operating client device (e.g., a customer, an agent), an authorized account associated with client device 110 (e.g., indicating authorizations of an operating user), and the like.

At step 704, a first entitlement policy to be applied to the graph query API call and a second entitlement policy to be applied to a response to the graph query API call may be retrieved. In some embodiments, the first entitlement policy and the second entitlement policy may be retrieved based on the client device that submitted the graph query API call and/or the schema. For example, pre- and/or post-enforcement policies may be selected based on the operations specified within the schema 122 (e.g., a query operation, a mutation operation, a subscription operation), a device type of client device 110 (e.g., mobile device, non-mobile device, IoT device, etc.), authorization privileges of a user operating client device 110 (e.g., a customer may have first authorization privileges while an agent may have second authorization privileges), or other criteria, or combinations thereof.

At step 706, an updated graph query API call including an entitled schema may be provided to a graph API via the API gateway. In some embodiments, the entitled schema authorizes querying of a first entity and prevents querying of a second entity. The updated graph query API call, including the entitled schema, may be generated, based on the first entitlement policy. For example, a pre-enforcement policy may be applied to graph query API call 120 to determine whether client device 110 is authorized to access sub-graphs associated with the first and second entities. In some examples, the pre-enforcement policy indicates that client device 110 has authorization to access a first sub-graph corresponding to the first entity (e.g., entity 124*a*) but lacks authorization to access a second sub-graph corresponding to the second entity (e.g., entity 124*b*).

At step 708, a response payload may be received from the graph API. The response payload may include first data associated with a first attribute of the first entity and second data associated with a second attribute of the first entity. For example, the response payload may include data for attributes 126*a*, 128*a* associated with entity 124*a*. The response payload may be received by API gateway 104. API gateway 104 may, using entitlements enforcement plugin 106, determine and/or apply one or more post-enforcement entitlement policies to the response payload.

At step 710, an updated response payload including the first data associated with the first attribute may be provided to the client device based on the second entitlement policy. In some examples, as mentioned above, entitlements enforcement plugin 106 may determine and/or apply a second entitlement policy (e.g., a post-enforcement entitlement policy) to the response payload to obtain the updated response payload. The second entitlement policy can prevent the second data associated with attribute 128*a* from being included in updated response payload 152. API gateway 104 may provide, as response 150 to graph query API call 120, updated response payload 152 to client device 110.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for enforcing attribute level entitlements within a super-graph.

2. The method of embodiment 1, comprising: receiving, from a client device, at an application programming interface (API) gateway, a graph query API call comprising a schema specifying a query operation to be performed; retrieving, based on the client device and the schema, a first entitlement policy to be applied to the graph query API call and a second entitlement policy to be applied to a response to the graph query API call; providing, based on the first entitlement policy, an updated graph query API call comprising an entitled schema to a graph API via the API gateway, wherein the entitled schema authorizes querying of a first entity and prevents querying of a second entity; receiving, at the API gateway, a response payload from the graph API comprising first data associated with a first attribute of the first entity and second data associated with a second attribute of the first entity; and providing, based on the second entitlement policy, as the response to the graph query API call, to the client device, an updated response payload comprising the first data associated with the first attribute, wherein the second entitlement policy prevents the second data from being included in the updated response payload.

3. The method of embodiment 2, further comprising: parsing the schema to identify schema keywords, wherein the schema keywords comprise text representing the query operation, the first entity and the second entity, and the first attribute and the second attribute; and determining entitlement keywords corresponding to the schema keywords, wherein the first entitlement policy and the second entitlement policy are selected based on the entitlement keywords.

4. The method of any one of embodiments 2-3, further comprising: computing, for each schema keyword identified from the schema, a semantic similarity score between the schema keyword and each entitlement keyword from the list of entitlement keywords; and selecting the first entitlement policy and the second entitlement policy based on the semantic similarity score of one or more schema keywords being greater than or equal to a threshold semantic similarity score.

5. The method of any one of embodiments 2-4, further comprising: determining, based on the schema, that the query operation includes a first sub-query directed to a first entity graph associated with the first entity and a second sub-query directed to a second entity graph associated with the second entity, wherein the first entitlement policy is applied to at least one of the first sub-query or the second sub-query.

6. The method of any one of embodiments 2-5, further comprising: determining, based on the schema, that the second attribute is represented by text corresponding to an entitlement keyword, wherein the second entitlement policy is applied to the second data based on the entitlement keyword.

7. The method of any one of embodiments 2-6, wherein the client device is associated with an authorized account with the computing system, the method further comprises: selecting at least one of the first entitlement policy or the second entitlement policy based on the authorized account.

8. The method of embodiment 7, wherein the authorized account is associated with a first user having first data access authorizations and a second user having second data access authorizations, wherein the first entitlement policy and the second entitlement policy are selected based on the first data access authorizations of the first user and the second data access authorizations of the second user.

9. The method of any one of embodiments 2-8, further comprising: receiving, from a plurality of client devices, at the API gateway, a plurality of graph query API calls including the graph query API call; and determining, based on the schema, that the query operation requests secure information, wherein at least one of the first entitlement policy or the second entitlement policy is selected based on the query operation requesting the secure information.

10. The method of embodiment 9, further comprising: preventing, based on the query operations requesting the secure information, the graph query API call from being provided to the graph API prior to application of the first entitlement policy; or preventing, based on at least one of the first data or the second data including the secure information, the response to the graph query API from being provided to the client device prior to application of the second entitlement policy.

11. The method of any one of embodiments 9-10, further comprising: providing, to the API gateway, each other graph query API call from the plurality of graph query API calls excluding the graph query API call, wherein the first entitlement policy is prevented from being applied to each other graph query API call.

12. The method of any one of embodiments 2-11, further comprising: applying the second entitlement policy to the response payload to generate the updated response payload, wherein the second data is prevented from being included in the updated response payload by obfuscating or removing the second data.

13. The method of any one of embodiments 2-12, further comprising: extracting, from a header of the graph query API call, a device identifier for the client device; determining a device type of the client device based on the device identifier; and selecting at least one of the first entitlement policy or the second entitlement policy based on the device type.

14. The method of any one of embodiments 2-13, further comprising: receiving, from the client device, at the API gateway, a graph API call comprising a separate schema specifying one or more non-query operations to be performed; and preventing the graph API call from being provided to the graph API based on the separate schema specifying the one or more non-query operations to be performed.

15. The method of any one of embodiments 2-3, wherein the entitled schema further authorizes a third entity to be queried, wherein providing the updated graph query API call comprises: providing, via the graph API, a first sub-query to a first data provider associated with the first entity and a second sub-query to a second data provider associated with the third entity, wherein the query operation specifies the first sub-query for the first entity and the second sub-query for the third entity.

16. The method of embodiment 15, wherein receiving the response payload comprises: creating a super-graph based on a first sub-graph, received from the first data provider, storing data associated with the first entity and a second sub-graph, received from the second data provider, storing data associated with the third entity, wherein the first data is retrieved from the super-graph.

17. The method of any one of embodiments 2-16, further comprising: receiving, from a data provider associated with the first entity, prior to receiving the graph query API call, a data provider schema specifying entities and attributes stored by a first sub-graph of the data provider; and determining that the schema included in the graph query API call is formatted based on the data provider schema.

18. The method of any one of embodiments 2-17, further comprising: applying the second entitlement policy to the second attribute to prevent the second data from being included in the updated response payload based on an attribute type of the second attribute.

19. The method of any one of embodiments 2-18, further comprising: executing an entitlements enforcement plugin to the API gateway, wherein the entitlements enforcement plugin causes the first entitlement policy and the second entitlement policy to be applied.

20. One or more non-transitory, computer-readable mediums storing instructions that, when executed by a data processing apparatus, cause the data processing apparatus to perform operations comprising those of any of embodiments 1-19.

21. A system comprising one or more processors; and memory-storing instructions that, when executed by the processors, cause the processors to effectuate operations comprising those of any of embodiments 1-19.

22. A system comprising means for performing any of embodiments 1-19.

What is claimed is:

1. A system for enforcing attribute level entitlements within a super-graph, the system comprising: a plurality of data providers that each store a graph comprising data products, wherein each data product includes entities and attributes describing the data product; an entitlement policy data repository that stores pre-enforcement entitlement policies and post-enforcement entitlement policies; a computing system implementing, via one or more processors, an entitlements enforcement plugin for an application programming interface (API) gateway of a graph API to: receive, from a client device, a graph query API call comprising a schema specifying a query operation to be performed, wherein the schema indicates a first entity associated with a first data provider to be queried and a second entity associated with a second data provider to be queried, the first entity comprising a first attribute and a second attribute; parse the schema to identify entitlement keywords, wherein the entitlement keywords indicate which of the pre-enforcement entitlement policies and post-enforcement entitlement policies to retrieve; retrieve, from the entity policy data repository, based on the client device and the entitlement keywords, a pre-enforcement entitlement policy to be applied to the schema prior to the graph query API call being provided to the graph API; responsive to applying the pre-enforcement entitlement policy to the schema to generate an entitled schema indicating that the client device is authorized to query the first entity and lacks authorization to query the second entity, provide an updated graph query API call comprising the entitled schema to the graph API; receive a response payload comprising first data associated with the first attribute and second data associated with the second attribute; retrieve, from the entitlement policy data repository, based on the client device and the entitlement keywords, a post-enforcement entitlement policy to be applied to the response payload prior to the response payload being provided to the client device; responsive to applying the post-enforcement entitlement policy to the response payload to generate an updated response payload comprising the first data, provide, to the client device, a response to the graph query API call comprising the updated response payload, wherein the post-enforcement entitlement policy prevents the second data from being provided to the client device.

2. A method implemented by one or more processors of a computing system, the method comprising:

receiving, from a client device, at an application programming interface (API) gateway, a graph query API call comprising a schema specifying a query operation to be performed;

retrieving, based on the client device and the schema, a first entitlement policy to be applied to the graph query API call and a second entitlement policy to be applied to a response to the graph query API call;

providing, based on the first entitlement policy, an updated graph query API call comprising an entitled schema to a graph API via the API gateway, wherein the entitled schema authorizes querying of a first entity and prevents querying of a second entity;

receiving, at the API gateway, a response payload from the graph API comprising first data associated with a first attribute of the first entity and second data associated with a second attribute of the first entity; and providing, based on the second entitlement policy, as the response to the graph query API call, to the client device, an updated response payload comprising the first data associated with the first attribute, wherein the second entitlement policy prevents the second data from being included in the updated response payload.

3. The method of claim 2, further comprising:

parsing the schema to identify schema keywords, wherein the schema keywords comprise text representing the query operation, the first entity and the second entity, and the first attribute and the second attribute; and determining entitlement keywords corresponding to the schema keywords, wherein the first entitlement policy and the second entitlement policy are selected based on the entitlement keywords.

4. The method of claim 2, further comprising:

retrieving a list of entitlement keywords;

computing, for each schema keyword identified from the schema, a semantic similarity score between the schema keyword and each entitlement keyword from the list of entitlement keywords; and selecting the first entitlement policy and the second entitlement policy based on the semantic similarity score of one or more schema keywords being greater than or equal to a threshold semantic similarity score.

5. The method of claim 2, further comprising:

determining, based on the schema, that the query operation includes a first sub-query directed to a first entity graph associated with the first entity and a second sub-query directed to a second entity graph associated with the second entity, wherein the first entitlement policy is applied to at least one of the first sub-query or the second sub-query.

6. The method of claim 2, further comprising:

determining, based on the schema, that the second attribute is represented by text corresponding to an entitlement keyword, wherein the second entitlement policy is applied to the second data based on the entitlement keyword.

7. The method of claim 2, wherein the client device is associated with an authorized account with the computing system, the method further comprises:

selecting at least one of the first entitlement policy or the second entitlement policy based on the authorized account.

8. The method of claim 7, wherein the authorized account is associated with a first user having first data access authorizations and a second user having second data access authorizations, wherein the first entitlement policy and the second entitlement policy are selected based on the first data access authorizations of the first user and the second data access authorizations of the second user.

9. The method of claim 2, further comprising:

receiving, from a plurality of client devices, at the API gateway, a plurality of graph query API calls including the graph query API call; and determining, based on the schema, that the query operation requests secure information, wherein at least one of the first entitlement policy or the second entitlement policy is selected based on the query operations requesting the secure information.

10. The method of claim 9, further comprising:

preventing, based on the query operation requesting the secure information, the graph query API call from being provided to the graph API prior to application of the first entitlement policy; or preventing, based on at least one of the first data or the second data including the secure information, the response to the graph query API call from being provided to the client device prior to application of the second entitlement policy.

11. The method of claim 9, further comprising:

providing, to the API gateway, each other graph query API call from the plurality of graph query API calls excluding the graph query API call, wherein the first entitlement policy is prevented from being applied to each other graph query API call.

12. The method of claim 2, further comprising:

applying the second entitlement policy to the response payload to generate the updated response payload, wherein the second data is prevented from being included in the updated response payload by obfuscating or removing the second data.

13. The method of claim 2, further comprising:

extracting, from a header of the graph query API call, a device identifier for the client device;

determining a device type of the client device based on the device identifier; and selecting at least one of the first entitlement policy or the second entitlement policy based on the device type.

14. The method of claim 2, further comprising:

receiving, from the client device, at the API gateway, a graph API call comprising a separate schema specifying one or more non-query operations to be performed; and preventing the graph API call from being provided to the graph API based on the separate schema specifying the one or more non-query operations to be performed.

15. The method of claim 2, wherein the entitled schema further authorizes a third entity to be queried, wherein providing the updated graph query API call comprises:

providing, via the graph API, a first sub-query to a first data provider associated with the first entity and a second sub-query to a second data provider associated with the third entity, wherein the query operation specifies the first sub-query for the first entity and the second sub-query for the third entity.

16. The method of claim 15, wherein receiving the response payload comprises:

creating a super-graph based on a first sub-graph, received from the first data provider, storing data associated with the first entity and a second sub-graph, received from the second data provider, storing data associated with the third entity, wherein the first data is retrieved from the super-graph.

17. The method of claim 2, further comprising:

receiving, from a data provider associated with the first entity, prior to receiving the graph query API call, a data provider schema specifying entities and attributes stored by a first sub-graph of the data provider; and determining that the schema included in the graph query API call is formatted based on the data provider schema.

18. The method of claim 2, further comprising:

applying the second entitlement policy to the second attribute to prevent the second data from being included in the updated response payload based on an attribute type of the second attribute.

19. The method of claim 2, further comprising:

executing an entitlements enforcement plugin to the API gateway, wherein the entitlements enforcement plugin causes the first entitlement policy and the second entitlement policy to be applied.

20. One or more non-transitory computer-readable media storing computer program instructions that, when executed by one or more processors, effectuate operations comprising:

receiving, from a client device, at an application programming interface (API) gateway, a graph query API call comprising a schema specifying a query operation to be performed;

retrieving, based on the client device and the schema, a first entitlement policy to be applied to the graph query API call and a second entitlement policy to be applied to a response to the graph query API call;

providing, based on the first entitlement policy, an updated graph query API call comprising entitled schema to a graph API via the API gateway, wherein the entitled schema authorizes querying of a first entity and prevents querying of a second entity;

receiving, at the API gateway, a response payload from the graph API comprising first data associated with a first attribute of the first entity and second data associated with a second attribute of the first entity; and providing, based on the second entitlement policy, as the response to the graph query API call, to the client device, an updated response payload comprising the first data associated with the first attribute, wherein the second entitlement policy prevents the second data from being included in the updated response payload.

* * * * *